United States Patent [19]
Boos

[11] Patent Number: 5,673,628
[45] Date of Patent: Oct. 7, 1997

[54] TABLE FOR SUPPORTING AND SECURING A PORTABLE COMPUTER IN A VEHICLE

[76] Inventor: Shane M. Boos, 8701 W. 97th St., Overland Park, Kans. 66212

[21] Appl. No.: 570,916

[22] Filed: Dec. 12, 1995

[51] Int. Cl.⁶ ........................................... A47B 37/00
[52] U.S. Cl. .................. 108/44; 108/138; 108/145; 248/918
[58] Field of Search ........................... 108/5, 44, 45, 108/138, 145; 248/172, 918

[56] References Cited

U.S. PATENT DOCUMENTS

| | | |
|---|---|---|
| 1,495,991 | 6/1924 | Drynan ................................ 248/172 |
| 3,023,063 | 2/1962 | Hansen ................................ 108/44 |
| 3,391,960 | 7/1968 | Megargle et al. . |
| 3,592,144 | 7/1971 | Futrell . |
| 4,619,386 | 10/1986 | Richardson . |
| 4,672,898 | 6/1987 | Davidson . |
| 4,852,499 | 8/1989 | Ozols . |
| 4,909,159 | 3/1990 | Gonsoulin . |
| 5,177,665 | 1/1993 | Frank et al. . |
| 5,359,349 | 10/1994 | Jambor et al. . |
| 5,438,936 | 8/1995 | Wang . |

OTHER PUBLICATIONS

Sales literature for Bogen Clamp System distributed by Bogan Photo Corp., 565 East Crescent Ave., P.O. Box 506, Ramsey, NJ 07446-0506, on information and belief published prior to Dec., 1994.

*Primary Examiner*—Peter M. Cuomo
*Assistant Examiner*—Gerold A. Anderson
*Attorney, Agent, or Firm*—Litman, McMahon and Brown, L.L.C.

[57] ABSTRACT

A table for supporting and securing a portable computer in a vehicle comprises a table top with adjustably positionable clamping members and an articulated arm secured at an upper end to the underside of the table and at a lower end to the interior of the car, typically the floor. The clamping members are slidingly secured along the sides of the table to permit sliding advancement of the clamping members relative to and along the sides to which they are attached. Opposed clamping members are retractable and extendable relative to one another. The table is removably securable to the vehicle and collapsible upon itself to permit it to be positioned out of the way when not in use.

5 Claims, 3 Drawing Sheets

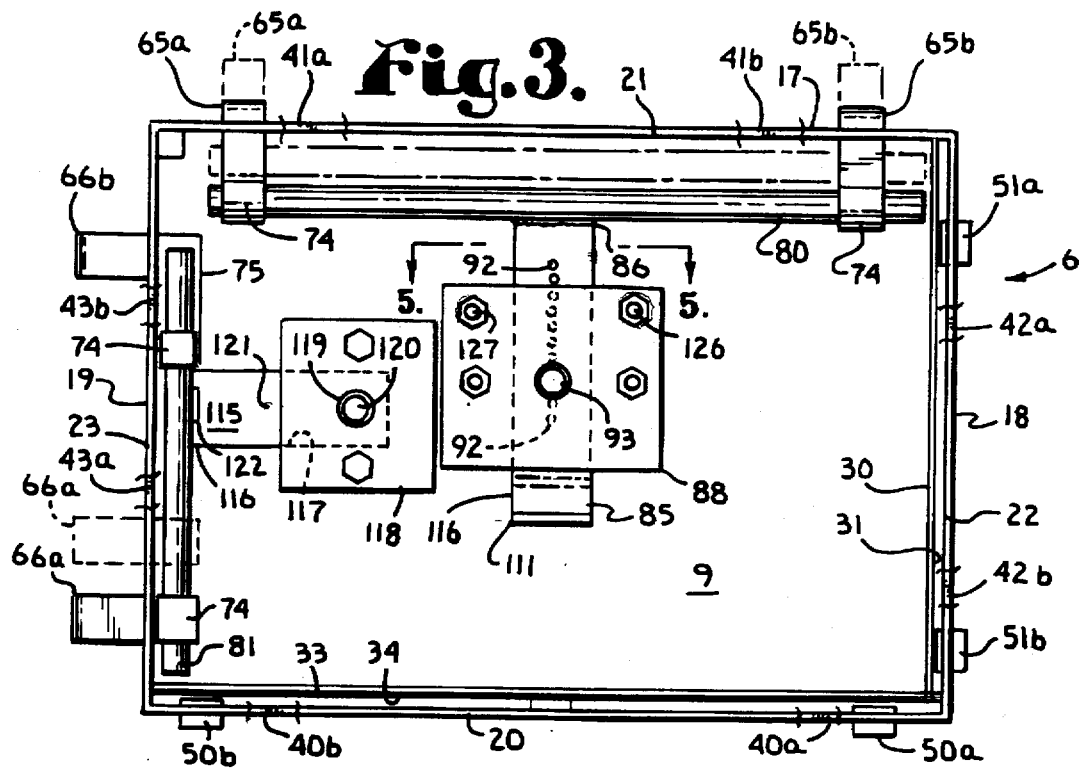
Fig.3.
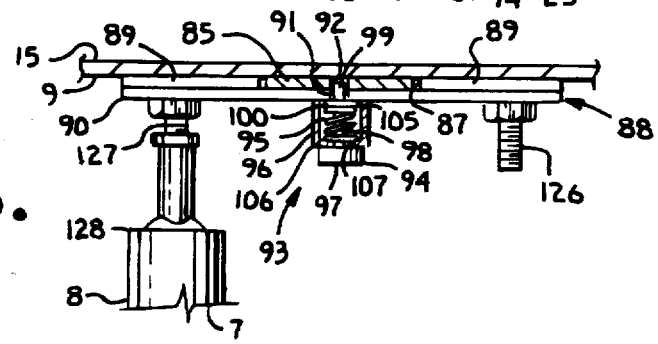
Fig.4.
Fig.5.

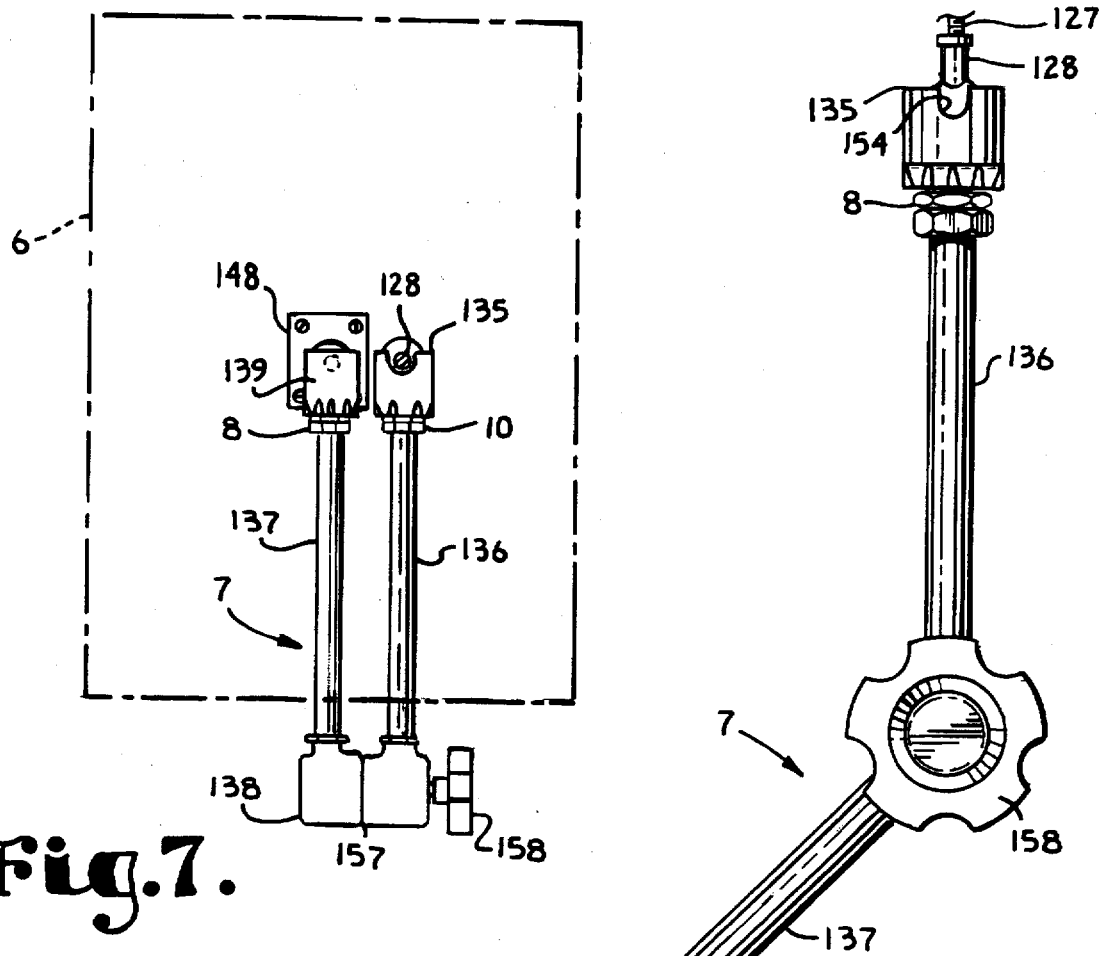
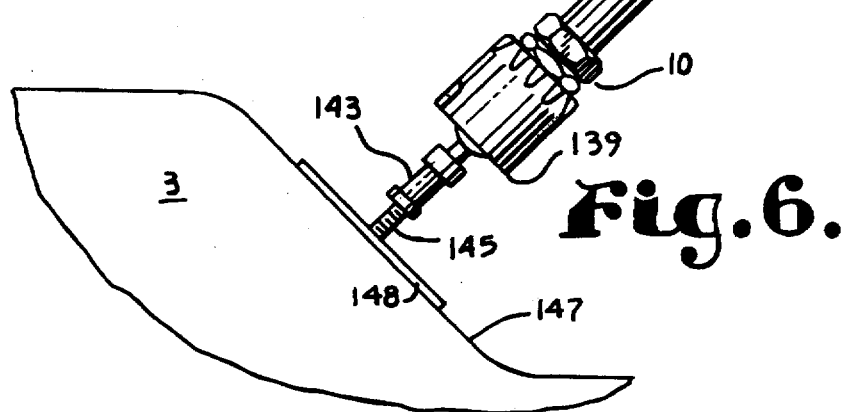
Fig.7.
Fig.6.

1

TABLE FOR SUPPORTING AND SECURING A PORTABLE COMPUTER IN A VEHICLE

BACKGROUND OF THE INVENTION

The present invention relates to a table for supporting and securing a portable computer in a vehicle.

Continuing advancements and developments in portable computers and their accessories have resulted in increasing use of portable computers in vehicles. An increasing number of sales representatives, insurance adjusters, delivery truck drivers and other workers who spend a considerable portion of their work time in a vehicle, carry portable computers in their vehicles to facilitate the entry, retrieval and utilization of data before, during and after sales calls, deliveries or out of office meetings.

Unfortunately, most vehicles are not designed to function as desks. The portable computer is usually placed in the passenger seat while the worker is in transit, and then placed in the worker's lap during use, hopefully after parking the vehicle. Many portable computers are damaged when the vehicle comes to a relatively quick stop and the momentum of the unrestrained portable computer causes it to crash into the dash of the car. In addition, trying to operate a portable computer in your lap while in the relatively cramped confines of an automobile can prove awkward and uncomfortable.

Although various table type structures have been developed for use in supporting items in a vehicle, most of these tables do not provide means for securing items to the table at least without modifying the item itself or which would not impair the useability and accessibility to a portable computer secured thereon. U.S. Pat. No. 5,438,936 issued to Wang on Aug. 8, 1995, discloses a table with clamps for securing an item therebetween. However, the clamps, which expand and retract along a fixed axis, may tend to block or cover up various ports, slots, electrical connectors or related openings along the sides of the portable computer which permit use of various accessories. Such ports, slots, and connectors might comprise floppy drives, CD rom readers, PC card slots, power supply ports, mouse attachment ports, printer ports, ports for connecting full size screens and keyboards, ports for modem cards and the like. The location of these openings, ports or connectors varies from computer to computer and therefore the table is limited in the variety of computers with which it may be used without restriction. There continues to be a need for a table which may be secured in a vehicle for supporting and securing almost any brand or style of personal computer thereon without impairing accessibility to the various ports, accessories or connectors for various accessories.

SUMMARY OF THE INVENTION

The present invention comprises a table for supporting and securing a portable computer in a vehicle. The table comprises a table top and an articulated arm secured at an upper end to the underside of the table top. A lower end of the articulated arm is secured to the interior of the car, typically the floor.

The table top comprises a support surface, a front edge, a rear edge, a left side edge and a right side edge. At least one and preferably two abutment members are secured to the table top generally along each of the front, rear, left side and right side edges by means for permitting each abutment member to be selectively positioned at multiple locations relative to and along the table top edge along which it is secured. Each of the abutment members extends at least partially, and preferably entirely, above the plane of the table top support surface.

The abutment members extending along at least one of the front or rear edges of the table top are secured to the table top by means for permitting retraction and extension of the abutment members relative to the abutment members on the opposite side thereof. Similarly, the abutment members extending along at least one of the left side or right side edges of the table top are secured to the table top by means for permitting retraction and extension of the abutment members relative to the abutment members on the opposite side thereof.

The lower end of the articulated arm is secured to the floor by means such as a threaded coupling secured to a bolt welded to the floor of the vehicle. The articulated arm is designed to be manipulated through a wide range of motion to permit the table top to be placed or oriented as desired within the vehicle. Further the articulated arm includes means for locking the arm in place after an orientation is selected.

To secure a portable computer to the table top, the bottom of the portable computer is placed on top of the table top support surface against the non-retractable abutment members. The non-retractable abutment members are preferably positioned such that they do not block access to any of the ports, openings or connectors on the side of the computer against which they abut. The retractable abutment members are then retracted to engage the remaining sides of the computer. The retractable abutment members are also preferably moved sideways with respect to the side of the computer against which they are retracted to avoid blocking access to any of the ports, openings or connectors on that side of the computer.

OBJECTS AND ADVANTAGE OF THE INVENTION

The objects and advantages of this invention include: providing a table which may be mounted in a vehicle and includes means for firmly securing an item to an upper surface of the table; providing such a table particularly well adapted for securing a wide variety of portable computers thereon; providing such a table wherein the securement mechanism does not interfere with accessibility to ports, opening or connectors on the sides of the computer; providing such a table which includes at least one abutment member secured to the table along each side thereof so as to be slidable relative to that side; providing such a table where at least one of the abutment members on opposed sides is retractable and extendable relative to the abutment member on the opposite side; providing such a table wherein the table is selectively positionable in a wide range of positions and orientations within a vehicle; providing such a table wherein the table is securable to an articulated arm which is removably secured to the vehicle; providing such a table which is collapsible to a relatively low profile configuration; providing such a table wherein the articulated arm is readily removable from the vehicle; providing such a table which is relatively inexpensive to manufacture and particularly well adapted for its intended purposes.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is an enlarged bottom plan view of the table of the present invention.

FIG. 4 an enlarged front elevational view of the table of the present invention having a portable computer secured thereon with the lid of the computer in the open position and with portions broken away to show interior detail.

FIG. 5 is an enlarged and fragmentary cross-sectional view, taken along line 5—5 of FIG. 3 and inverted to show the normal orientation of the table.

FIG. 6 is a fragmentary plan view of the articulated arm of the table of the present invention in an extended position.

FIG. 7 is a view of the articulated arm folded into a collapsed position with the table top broken away from the articulated arm, but shown in phantom lines to show possible positioning of the table top relative to the collapsed articulated arm.

DETAILED DESCRIPTION OF THE INVENTION

Figure 1:
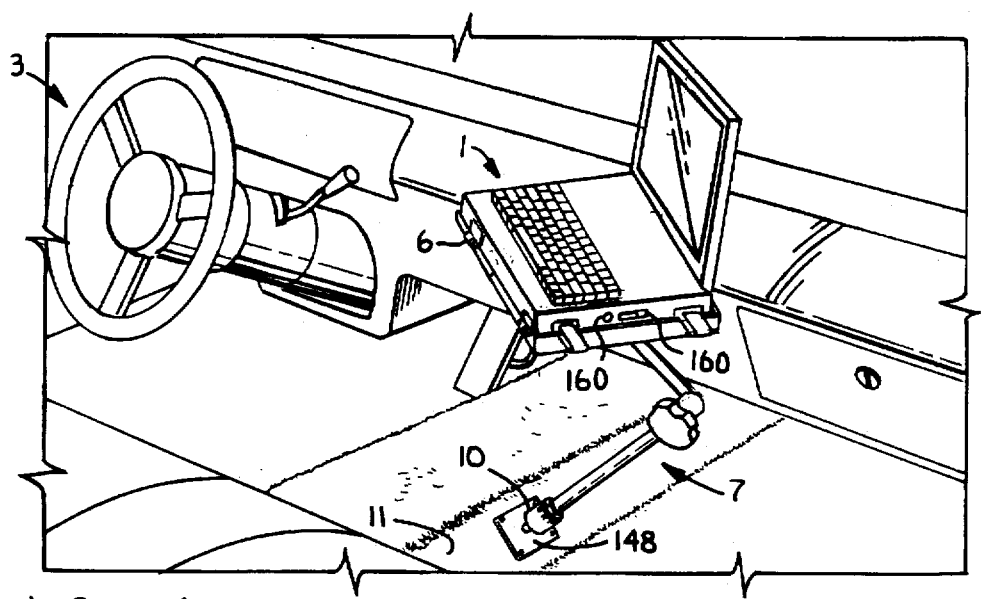
FIG. 1 is a perspective view of a table of the present invention secured within a vehicle and comprising a table top and an articulated arm and having a portable computer secured thereon with the lid of the computer in an open position.
Figure 2:
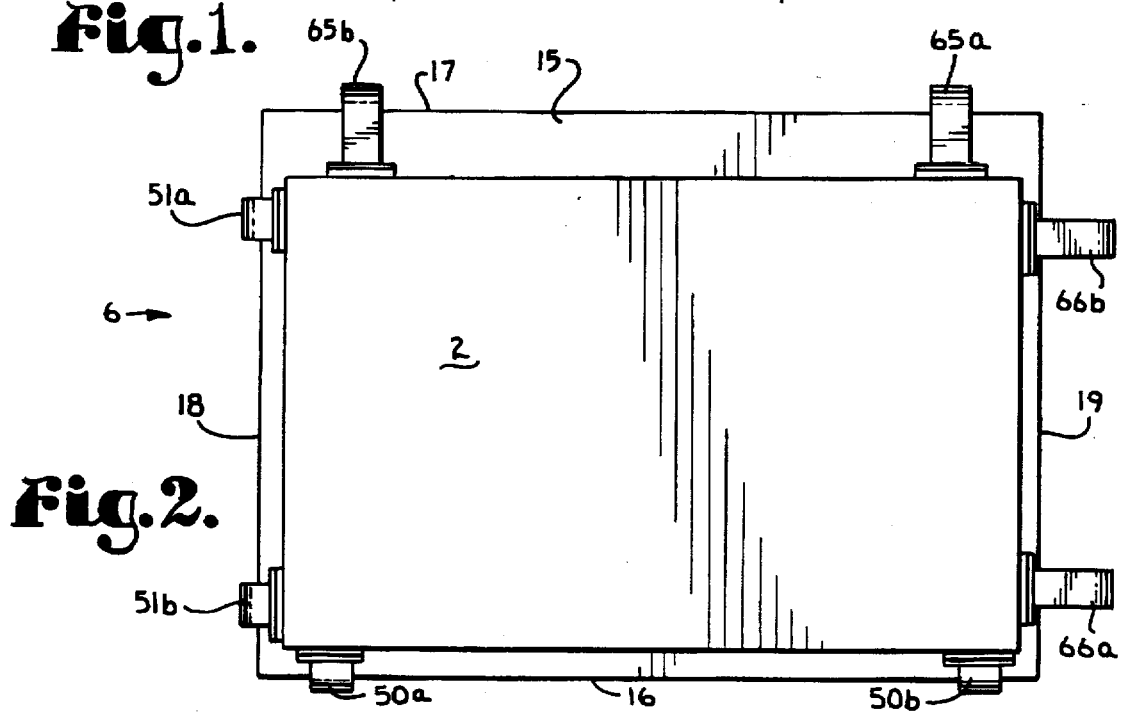
FIG. 2 is an enlarged top plan view of the table of the present invention having a portable computer secured thereon with the lid of the computer in a closed position.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 comprises a table for supporting and securing a portable computer 2 in a vehicle 3. The table 1 comprises a table top 6 and an articulated arm 7 secured at an upper end 8 to an underside 9 of the table top 1. A lower end 10 of the articulated arm 7 is secured to the floor 11 of the vehicle 3. For the purpose of this application, directional terms will relate to the table as oriented in FIG. 4 which shows the front of the table 1 with a computer 2 secured thereto.

The table top 6 is rectangular and comprises a support surface 15, a front edge 16, a rear edge 17, a left side edge 18 and a right side edge 19. Flanges 20, 21, 22 and 23 extend downward from edges 16, 17, 18 and 19 respectively. An internal wall 30 is secured to the underside 9 of the table top 6 and extends along the left side of the table 1 spaced slightly behind the left side flange 22. A channel 31 is formed between the internal wall 30 and the flange 22. Similarly, an internal wall 33 is secured to the underside 9 of the table top 6 and extends along the front side of the table 1 spaced slightly behind the front edge flange 20. A channel 34 is formed between the internal wall 33 and the flange 20.

As shown in FIG. 4, slots 40, 41, 42 and 43 are formed in and extend substantially across flanges 20, 21, 22, and 23 respectively. Each slot 40, 41, 42 and 43 is divided in two sections 40a and 40b, 41a and 41b, 42a and 42b and 43a and 43b by a spacer or support member 45 in the respective flange 20, 21, 22 and 23.

Front abutment members 50a and 50b are secured to the table top 6 along the front edge 16 thereof and left side abutment members 51a and 51b are secured to the table top 6 along the left side edge 18. As best seen in FIG. 4, with reference to left side abutment member, each front abutment member 50a and 50b and left side abutment member 51a and 51b comprises a vertically aligned abutment plate 55, an abutment pad 56 and a support member 57. The abutment pad 56 is preferably formed of a resilient, closed cell type foam and is secured to the abutment plate 55 by means such as gluing.

The support member 57 comprises a U-shaped portion 58 secured at one end to the abutment plate 55 on a side opposite the abutment pad 56. The U-shaped portion 58 extends away from the plate 55 and then curves downward back toward the plate 55. A depending leg 59 extends downward from the other end of the U-shaped portion 58 so as to extend generally below the abutment plate 55.

The depending legs 59 of the front abutment members 50a and 50b are inserted through slots 40a and 40b respectively such that the depending legs 59 of abutment members 50a and 50b extend into the front channel 34. Similarly, the depending legs 59 of the left side abutment members 51a and 51b are inserted through slots 42a and 42b respectively such that the depending legs 59 of abutment members 51a and 51b extend into the left side channel 31.

The U-shaped portion 58 of each abutment member 50a, 50b, 51a and 51b is sized and shaped to position the abutment plate 55 and abutment pad 56 attached thereto slightly above the plane of the table top support surface 15. Securement of the depending legs 59 in channels 31 and 34 permits the abutment members 50a, 50b, 51a and 51b to be slidingly advanced along the respective slots 40a, 40b, 42a and 42b and generally along the front edge 16 and the left side edge 18 of the table top 6 respectively and therefore laterally relative to a front side and left side of the table top 6.

Rear abutment members 65a and 65b are secured to the table top 6 along the rear edge 17 thereof and right side abutment members 66a and 66b are secured to the table top 6 along the right side edge 19. As best shown in FIG. 4 with reference to the right side abutment member 66a, each rear abutment member 65a and 65b and right side abutment member 66a and 66b comprises a vertically aligned abutment plate 70, an abutment pad 71 and a support member 72. The abutment pad 71 is preferably formed of a resilient, closed cell type foam and is secured to the abutment plate 70 by means such as gluing.

Each support member 72 comprises a U-shaped portion 73 secured at one end to the abutment plate 70 on a side opposite the abutment pad 71. The U-shaped portion 73 extends away from the plate 70 and then curves downward back toward and below the plate 70. The U-shaped portions 73 of the rear and right side abutment members 65a, 65b, 66a and 66b are considerably longer than the U-shaped portions 58 of the front and left side abutment members 50a, 50b, 51a and 51b. A loop 74 is formed in the support members 72 at a second end of the U-shaped portions 73 except for the support member 72 for right side abutment member 66b wherein the loop 74 is spaced to the side of the second end of the U-shaped member 73 by spacer 75.

The loops 74 of rear abutment members 65a and 65b are slidingly secured around a rear adjustment rod 80. Rear adjustment rod 80 is slidingly secured to the underside 9 of the table top 6 and extends substantially across the rear edge 17. The loops 74 of right side abutment members 66a and 66b are slidingly secured around a right side adjustment rod 81. Right side adjustment rod 81 is slidingly secured to the underside 9 of the table top 6 and extends substantially across the right side edge 19.

A lower leg 82 of each U-shaped member 73 of the rear abutment members 65a and 65b and right side abutment members 66a and 66b extends through rear slots 41a and 41b and 42a and 42b respectively for sliding movement of the rear and right side abutment members 65 and 41 laterally relative to said rear and said right side of said table top 6 respectively. The U-shaped members 73 are sized and shaped to position the abutment plates 70 and abutment pad 71 attached thereto slightly above the plane of the table top support surface 15.

As shown in FIG. 3, a first sliding bar 85 is welded at a first end 86 to the rear adjustment rod 80 centrally thereof and extends toward the front edge 16 of the table top 6. As shown in FIG. 5, the first sliding bar 85 extends through a guide channel 87 formed by a first guiding assembly 88. The first guiding assembly 88 comprises two rectangular plates 89 secured in spaced apart relation between a cover plate 90 and the underside 9 of the table top 6 to define the guide channel 87. A circular opening 91 extends through the cover plate 90, centrally thereof and into communication with the guide channel 87. A plurality of apertures 92 are punched or formed in the first sliding bar 85 centrally along the longitudinal axis in relatively closely spaced relation. The apertures 92 are slidingly alignable with the opening 91 in the cover plate 90.

A first locking assembly 93 comprising a locking pin 94, a compression type coil spring 95 and a pin housing 96 is secured to the cover plate 90. The locking pin 94 comprises a head 97, a shaft 98 and a point 99. An annular stop or seat 100 is welded to the shaft 98 of the pin 94 such that the point 99 extends therebeyond. The pin housing 96 is generally cylindrical and open at a first end 105 and closed at a second end 106. A circular opening 107 is formed in the pin housing second end 106.

The pin housing 96 is mounted at the first end 105 to the cover plate 90 centrally thereof such that the pin housing 96 encloses circular opening 91 in the cover plate 89 and such that the circular opening 107 in the pin housing 96 is aligned with the circular opening 91 in the cover plate 90. The locking pin 94 is mounted relative to the pin housing 96 such that the pin shaft 98 extends through the circular opening 107 in the housing second end 106 and the opening 91 in the cover plate 90. The annular seat 100 is mounted on the shaft 98 within the housing 96 and the spring 95 is mounted on the shaft 98 between the annular seat 100 and the pin housing second end 106. The pin head 97 is secured to the pin shaft 98 outside of the pin housing adjacent the second end 106 thereof.

The spring 95 biases the annular seat 100 toward and against the cover plate 95 so as to bias the pin point 99 into the channel 87 and into an aperture 92 aligned with the cover plate opening 91 thereby locking the sliding bar 85 in place. The pin head 97 may be grasped and pulled against the biasing force of the spring 95 to advance the pin point 99 out of the aperture 92 to permit the bar 85 to be slidingly advanced in the guide channel 87. A handle 111 is formed on a second end 116 of the first sliding bar 85 and extends downward thereto for grasping by a user to facilitate sliding of the first sliding bar 85 relative to the guide channel 87. Release of the pin head 97 allows the biasing force of the spring 95 to advance the pin point 99 back into aperture 92 aligned therewith to lock the first sliding bar 85 in place.

Sliding of the first sliding bar 85 toward the table top rear edge 17 advances the rear adjustment rod 80 and the rear abutment members 65a and 65b rearwardly. Sliding of the first sliding bar 85 toward the table top front edge 16 advances the rear adjustment rod 80 and the rear abutment members 65a and 65b forwardly. Sliding of the first sliding bar 85 permits movement of the rear abutment members transversely relative to said table top rear edge 17 or a rear side of said table top 6.

Referring to FIG. 3, a second sliding bar 115 is welded at a first end 116 to the right side adjustment rod 81 centrally thereof and extends toward the left side edge 118 of the table top 6. The second sliding bar 115 extends through a guide channel 117 formed by a second guiding assembly 118. The second guiding assembly 118 is of the same construction as first guiding assembly 88. A second locking assembly 119 of the same construction as the first locking assembly 93 is secured to the second guiding assembly 118. The second locking assembly 119 incorporates a locking pin 120 which cooperates with apertures 121 formed in and aligned along a longitudinal axis of the second sliding bar 115 to permit or prevent the sliding bar 115 to be slid relative to the guide channel 117. A handle 122 is formed on the second sliding bar 115 and extends downward therefrom for grasping by a user to facilitate sliding of the second sliding bar 115 relative to the guide channel 117.

Sliding of the second sliding bar 115 toward and away from the table top right side edge 19 correspondingly advances the right side adjustment rod 81 and the right side abutment members 66a and 66b away from and back toward the center of the table top 6. Sliding of the second sliding bar 115 permits movement of the right side abutment members 66a and 66b transversely relative to said table top rear edge 17 or a rear side of said table top 6.

The abutment members 50, 51, 65 and 66, the adjustment rods 80 and 81, the sliding bars 85 and 115, the guiding assemblies 88 and 118 and the locking assemblies 93 and 119 generally function as clamping assemblies with the abutment members 50, 51, 65 and 66 functioning as clamping members. It is foreseen that various structure could be incorporated for providing the clamping function in the manner contemplated in the present invention, as discussed below in more detail. For example, abutment members on all four sides could be adjustable.

The articulated arm 7, as shown in FIGS. 1, 6, and 7 is of the type sold by Bogen Photo Corp. of Ramsey, N.J. under the trade names Variable Friction Magic Arm or Bogen Magic Arms. The arm 7 may be connected to one of a pair of threaded studs 126 and 127 which are secured to the cover plate 90 and extend therebelow. The threaded studs 126 and 127 are adapted to be threaded into a first threaded coupling 128 on the upper end 8 of the articulated arm 7 for securing the table top 6 to the arm 7.

The threaded coupling 128 is connected to a first ball and socket joint 135 which is connected to an upper arm 136. The upper arm 136 is connected to a lower arm 137 by rotational locking joint 138. A second ball and socket joint 139 is connected to the lower arm 137 at an end opposite the rotational locking joint 138. A second threaded coupling 143 is connected to and extends outward from the second ball and socket joint 139.

The second threaded coupling 143 is adapted to be secured to a threaded stud 145 welded the floor 147 of the vehicle 3. The stud 145 may be welded to a plate 148 which is in turn welded or bolted to the floor of the vehicle 3. It is foreseen that other suitable connectors could be utilized in accordance with this invention as an alternative to the coupling and stud connector shown, such as a plug connector with male and female members.

The articulated arm 7 is designed to be manipulated through a wide range of motion to permit the table top 6 to be placed or oriented as desired within the vehicle 3. The first ball and socket joint 135 permits 360 degree rotation of the table top 6 relative to the upper arm 36 and would permit rotation of the table top 6 across a horizontal plane. Such rotation would permit a portable computer 2 secured on the table top to be rotated from facing the driver's seat of the vehicle 3 to facing the passenger seat. The first ball and socket joint 135 also permits pivotability of the table top 6 relative to the upper arm 136 of up to 90 degrees by rotation of the first threaded coupling 128 into a slot 154 in joint 135. The second ball and socket joint 135 also permits 360 degree rotation and up to 90 degree pivotability of the lower arm 137 relative to the floor 147 of the vehicle 3 through similar means.

The rotational locking joint 138 permits 360 degree rotation of the upper arm 136 relative to the lower arm 137 which facilitates raising or lowering the relative position of the table top 6 within the vehicle 3. The upper arm 136 and the lower arm 137 may be pivoted in and out of side-by-side alignment. As shown in FIG. 7, the cooperation of all three joints 135, 138 and 139 would permit the entire arm 7 to be collapsible down to the floor 147 in a relatively low profile so that the table 1 may be placed out of the way when not in use. The remainder of the table 1 can also be removed from the stud 145 and likewise folded to facilitate carrying or for storage outside the vehicle 3. A locking assembly 157 is provided and includes a locking knob 158. Tightening of the locking knob 158, locks all three joints, 135, 138 and 139 firmly into position after the arm 7 has been set in the desired alignment.

It is foreseen that the upper and lower arms 136 and 137 of the articulated arm 7 could be constructed to be telescoping. In addition, spacers or extenders might be provided which could be secured to the arm 7 at either end to increase the overall length of the arm 7. Further the means for connecting the arm 7 to the vehicle 3 and to the table top 6 could comprise a wide range of means including clamping structure which would permit the arm 7 to be quickly coupled to existing structure in the vehicle 3 or in other settings without the need for modifying the vehicle 3, through welding on a threaded stud 145, to permit use of the table 1.

To secure a portable computer 2 to the table top 6, the rear and right side abutment members 65a, 65b, 66a and 66b are positioned in their rearmost and rightmost positions respectively. The bottom of the portable computer 2 is placed on top of the table top support surface 15 and positioned such that portions of the front and left side of the computer abut against the front and left side abutment members 50a, 50b, 51a and 51b. The front and left side abutment members 50a, 50b, 51a and 51b may be slid along the respective left and right side edges 16 and 18 and positioned such that they do not obstruct access to any openings, ports, connectors or the like 160 on the sides of the portable computer 2.

The rear and right side abutment members 65a, 65b, 66a and 66b are then advanced or retracted into engaging relationship with the rear and right side of the portable computer 2. The rear and right side abutment members 65a, 65b, 66a and 66b may also be slid sideways relative to the rear and right side adjustment rods 80 and 81 and the rear and right side edges 17 and 19 respectively such that they do not obstruct access to any openings, ports connectors or the like 160 on the sides of the portable computer 2.

For the purposes of this application, references to the sides of the table top 6 are intended to include any area off center of the table top 6 and would include the front, rear, left side and right side edges 16, 17, 18 and 19 respectively.

The apertures 92 and 121 in the first and second sliding bars 85 and 115 respectively are spaced sufficiently close together and the abutment pads 56 and 71 are sufficiently thick to permit the abutment member 50, 51, 65 and 66 to snugly and firmly engage portable computers of various dimensions.

Although the abutment members 50, 51, 65 and 66 abut against the sides of the portable computer 2, it is foreseen that abutment members could be used which abutted against or pressed downward on an upper surface of the portable computer 2 or other item to be secured to the table top 6. In addition, it is also foreseen that instead of utilizing structure to permit retraction and extension between opposed pairs of abutment members 50 and 65 and 51 and 66 the distance between opposed pairs of abutment members 50, 65, 51 and 66 could be modifiable by providing sets of interchangeable abutment pads 56 and 71 of different thicknesses which would be selectively securable to the abutment plates 55 and 70. The thickness of the abutment pads 56 and 71 selected would depend on the dimensions of the computer 2 to be secured thereto.

Although means are disclosed for slidingly securing the abutment members to the table top, it is foreseen that other means for selectively positioning the abutment members laterally and transversely relative to the sides of the table top 6. For example, the table top 6 could include a gridwork of holes extending through the support surface 15 and each abutment member would have a peg removable insertable in a selected hole for selectively securing the abutment member to the table top 6 at that location.

Clips, not shown, may be used with the table 1 for securing various cords or electrical connectors (not shown) to the table 1 and out of the way. It is also foreseen that the clips could be integrally formed into the table top 6 and the articulated arm 7.

It is also foreseen that various attachments could be used in association with or incorporated into the table 1 or that the table could be modified to readily receive such attachments. Such attachments could include structure to support a mouse, structure to support a car phone, structure to support a printer or a beverage container holders.

It is to be understood that while certain forms of the present invention have been illustrated and described herein, it is not to be limited to the specific forms or arrangement of parts described and shown.

What is claimed and desired to be secured by Letters Patent is as follows:

1. A table for supporting and securing a portable computer in a vehicle comprising:

a. a table top having a support surface, a front edge, a rear edge, a left side edge and a right side edge;

b. at least two front abutment members each comprising an abutment plate and a support member; said support members slidingly secured to said table top such that said abutment plates are slidingly advanceable laterally relative to said front edge of said table top and said abutment plates are positioned above the plane of said support surface;

c. at least two rear abutment members each comprising an abutment plate and a support member; said support members slidingly secured to said table top such that said abutment plates are slidingly advanceable laterally relative to said rear edge of said table top and said abutment plates are positioned above the plane of said support surface;

d. at least two right side abutment members each comprising an abutment plate and a support member; said support members slidingly secured to said table top such that said abutment plates are slidingly advanceable transversely relative to said right side edge of said table top and said abutment plates are positioned above the plane of said support surface;

e. at least two left side abutment members each comprising an abutment plate and a support member; said support members slidingly secured to said table top such that said abutment plates are slidingly advanceable laterally relative to said left side edge of said table top and said abutment plates are positioned above the plane of said support surface;

f. at least one set of said front and rear abutment members being slidingly secured to said table top such that at least one set of said respective abutment plates are slidingly advanceable transversely relative to said front and rear edges of said table top;

g. at least one set of said left side and right side abutment members being slidingly secured to said table top such that at least one set of said respective abutment plates are slidingly advanceable transversely relative to said left side and right side edges of said table top; and h. a support member securable at one end to said table top and at an opposite end to a vehicle.

2. The table as in claim 1 wherein said front, rear, left side and right side abutment members comprise:

a. a resilient abutment pad secured to each of said abutment plates for providing resilient engagement of said item to be secured to said table by said abutment members.

3. The table as in claim 1 further comprising:

a. a locking assembly secured to said table top and selectively preventing sliding advancement of said front, rear, left side or right side abutment members transversely relative to said front edge, rear edge, left side edge and right side edge respectively.

4. The table as in claim 1 wherein said support member comprises:

a. an articulated arm.

5. The table as in claim 4 wherein said articulated arm includes:

a. a first arm portion and a second arm portion; said first arm portion pivotally connected at a first end to said vehicle to permit pivotal rotation of said first arm portion of at least approximately ninety degrees relative to said vehicle; a second end of said first arm portion pivotally connected to a first end of said second arm portion such that said second arm portion may be pivoted in and out of generally side-by-side alignment with said first arm portion; said second arm portion pivotally connected at a second end to said table top.

* * * * *